United States Patent [19]

Schneider

[11] 3,838,345

[45] Sept. 24, 1974

[54] ASYNCHRONOUS SHIFT CELL

[75] Inventor: David T. Schneider, Hatfield, Pa.

[73] Assignee: Sperry Rand Corporation, Blue Bell, Pa.

[22] Filed: May 25, 1973

[21] Appl. No.: 363,909

[52] U.S. Cl. .......... 328/37, 307/247 R, 340/173 FF

[51] Int. Cl. .......... G11c 19/00

[58] Field of Search .......... 328/37, 133; 307/247 R; 340/173 FF

[56] References Cited

UNITED STATES PATENTS

| | | | |
|---|---|---|---|
| 3,166,715 | 1/1965 | Cogar | 328/37 |
| 3,177,374 | 4/1965 | Simonian et al. | 307/247 X |
| 3,755,746 | 8/1973 | Hogue et al. | 328/133 |
| 3,757,231 | 9/1973 | Faustini | 328/37 |

*Primary Examiner*—John S. Heyman
*Attorney, Agent, or Firm*—Rene A. Kuypers

[57] ABSTRACT

There is disclosed herein a new internal cell construction wherein a plurality of such cells may be connected in series for use in an asynchronous binary shift register.

4 Claims, 4 Drawing Figures

PATENTED SEP 24 1974 3,838,345

SHEET 1 OF 3

ASYNCHRONOUS SHIFT CELL

BACKGROUND OF THE INVENTION

1. Field of the Invention

This invention relates to the field of shifting data storage cells.

2. Description of the Prior Art

A known prior art patent which pertains to the instant disclosure is U.S. Pat. No. 3,166,715.

In the known prior art system mentioned above, three main gates are used for data storage and full/empty detection. In the instant system, two flip-flops are used for data storage (one for 1's and one for 0's) and decode of the flip-flops determine whether the cell is full/empty. This latter arrangement provides for simplicity of structure and operation, particularly when it is necessary for finding faulty components in a non-functioning circuit.

Another feature of the present invention relates to the self clearing operation. Self clearing in the instant invention is accomplished by an edge triggering flip-flop which speeds cell clearing and provides noise immunity.

DESCRIPTION OF THE PREFERRED EMBODIMENTS

Figure 1:
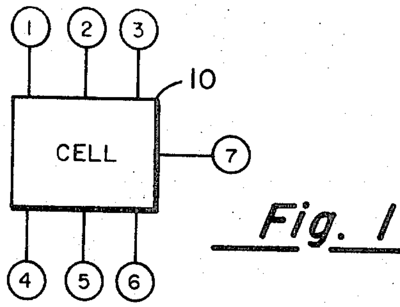
FIG. 1 shows a simple logic block of the shifting storage cell showing four input lines and three output lines.

Referring now to FIG. 1, the binary memory shift cell 10 (hereinafter referred to as a cell) is shown with four input lines, 2, 4, 6 and 7 and three output lines 1, 3 and 5. Line 1 is the 1's output line whereas line 2 is the enable transfer-out which activates the cell's transfer circuit allowing the data outputs to reflect the cell's internal data state. Line 3 is the 0's output line. Line 4 is the 1's input line whereas line 5 is the enable transfer-in line. Line 6 is the 0's input line and line 7 is the general clear line and overrides all other signals.

Figure 2:
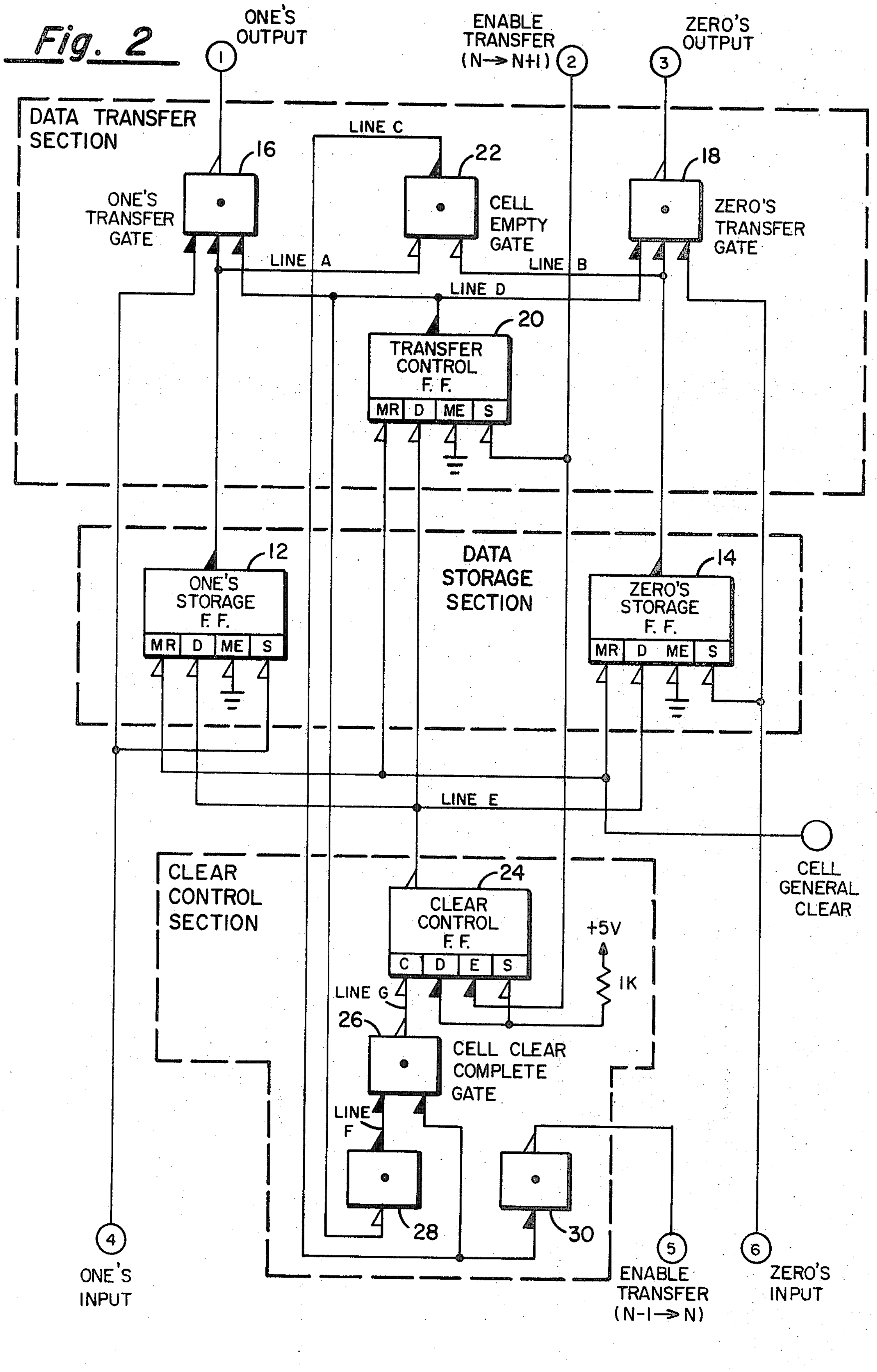
FIG. 2 is a detailed version of the asynchronous shift cell shown in FIG. 1.

Referring now to FIG. 2, which is a detailed embodiment of the cell shown in FIG. 1, it is readily seen that it is composed of three major sections which are distinguishable on a functional basis. These sections, which are shown in outlined form, are referred to as the Data Transfer Section, the Data Storage Section and the Clear Control Section. The Data Storage Section is comprised of the 1's storage flip-flop 12 and the 0's storage flip-flop 14. The l's transfer gate 16, the 0's transfer gate 18, the transfer control flip-flop 20 and the cell empty gate 22 make up the Data Transfer Section. The Clear Control Section is made up of the clear control flip-flop 24 and the cell clear complete gate 26. The inverters 28 and 30 also may be considered as part of the Clear Control Section.

Referring now to the Data Storage Section in particular, a 1 and 0 may be stored in the respective flip-flops 12 and 14. In the instant embodiment the flip-flops 12 and 14 are designated as Fairchild 9314 quad latch flip-flops. A bit is stored in either of the flip-flops 12 and 14 if the Master Enable (ME) is low (hereinafter L), the Master Reset (MR) is high (hereinafter H), the Data terminal (D) is H, and the Set (S) is pulsed L. The ME and MR are common for the two flip-flops 12 and 14 and are used as follows: MR is the cell's general clear which overrides all other inputs and clears the cell and forces the output L; ME is grounded or L causing the latches 12 and 14 to be always enabled. The latches 12, 14 and 20 are used as reset-set flip-flops where the S is the set terminal and the D the reset terminal wherein the reset overrides the set input. The S input of the 1's and 0's storage flip-flops 12 and 14 are respectively connected to the 1' s and 0's input to the cell. The D inputs are connected to the third control flip-flop 24 and are used to clear the cells 12 and 14 during operation. The output of the cells 12 and 14 are connected to the cell full/empty gate 22 as well as to the two transfer gates 16 and 18, respectively.

For reference purposes the Truth Table for the flip-flops 12, 14 and 20 is included below:

| MR | ME | D | S | $Q_N$ | |
|---|---|---|---|---|---|
| H | L | L | L | L | R/S MODE |
| H | L | H | L | H | |
| H | L | L | H | L | |
| H | L | H | H | $Q_{N-1}$ | |
| L | X | X | X | L | RESET |

X Don't Care
L Low Voltage Level
H High Voltage Level
$Q_N$ Present Output State
$Q_{N-1}$ Previous Output State The white-black flag designation shown at the terminals of the flip-flops 12, 14, 20 and 24 as well, show the active state of the input. For example, the white flag indicate a L voltage input and accordingly the input terminal MR of the latch type flip-flop must be L to clear the flip-flops 12, 14 or 20. In other words, the L input is the active state of the input terminal MR. The same white flag designation at the C terminal indicates the active state of the $T^2L$ flip-flop 24 for clearing purposes as will be seen in a later paragraph. In like manner it can be appreciated that the active state of the inputs ME and S of the latch type flip-flop is L for setting the latter.

The transfer control flip-flop 20, which is also a quad latch type, sets (i.e., the output goes H) if the enable transfer signal (N → N+1) is L, the cell general clear signal is H, and the cell is not in an operational clearing state (i.e., line E is H). The transfer control flip-flop setting causes the data stored in the 1's or 0's storage flip-flops 12 and 14 to be gated out provided that there is a bit stored therein and the input pulse (i.e., the 1's or 0's input) has gone away. The 1's or 0's input pulse on the transfer gates prevents the data from being duplicated at the output if the input pulse is longer than the cell cycle time. Cell cycle time is defined as the length of time required to transfer a bit out, and accept another bit capable of transferring the second bit out. When the enable transfer (N → N+1) line goes H (signifying that transfer to another cell is terminated), the transfer control flip-flop 20 remains in a set state until the clear control flip-flop 24 resets it. The cell empty gate 22 detects when both storage flip-flops 12 and 14 are reset and activates the enable transfer (N–1 → N) line through an inverter. If either of the storage flip-flops are set, the cell empty gate causes the enable transfer (N – 1 → N) line to go H (signifying that the cell cannot accept information from another cell) through the inverter 30.

Cell clearing is obtained by setting the clear control flip-flop 24. In the preferred embodiment the clear control flip-flop 24 is a type known as the $T^2L$ (transistor-transistor logic) D type, edge triggered flip-flop. This flip-flop sets on the positive edge of the enable transfer (N → N+1) line and terminal C, S and D are H. In other words this flip-flop type is made to set during an L to H transition so that there is a sampling of the signal on terminal D by the positive going signal on terminal E. This L-H transition is such so that the L state must occur for at least 10 nanoseconds and the H state for 15 nanoseconds and is particularly useful since it obviates a transient or noise from triggering the flip-flop. This negative to positive transition or edge is caused by the raising of the enable transfer (N N+1) line signifying that transfer is terminated as above stated. The clear control flip-flop 24 setting causes the storage flip-flops 12 and 14 and the transfer control flip-flop 20 to be reset stopping the transfer. When the Cell Clear Complete gate sees that the cell is empty, i.e., that the storage and transfer control flip-flops 12 and 20, respectively, are reset, it jams the clear control flip-flop 24 to the reset condition by causing terminal C to go L. This signal overrides all other input signals and leaves the cell ready to accept another bit.

Figure 3:
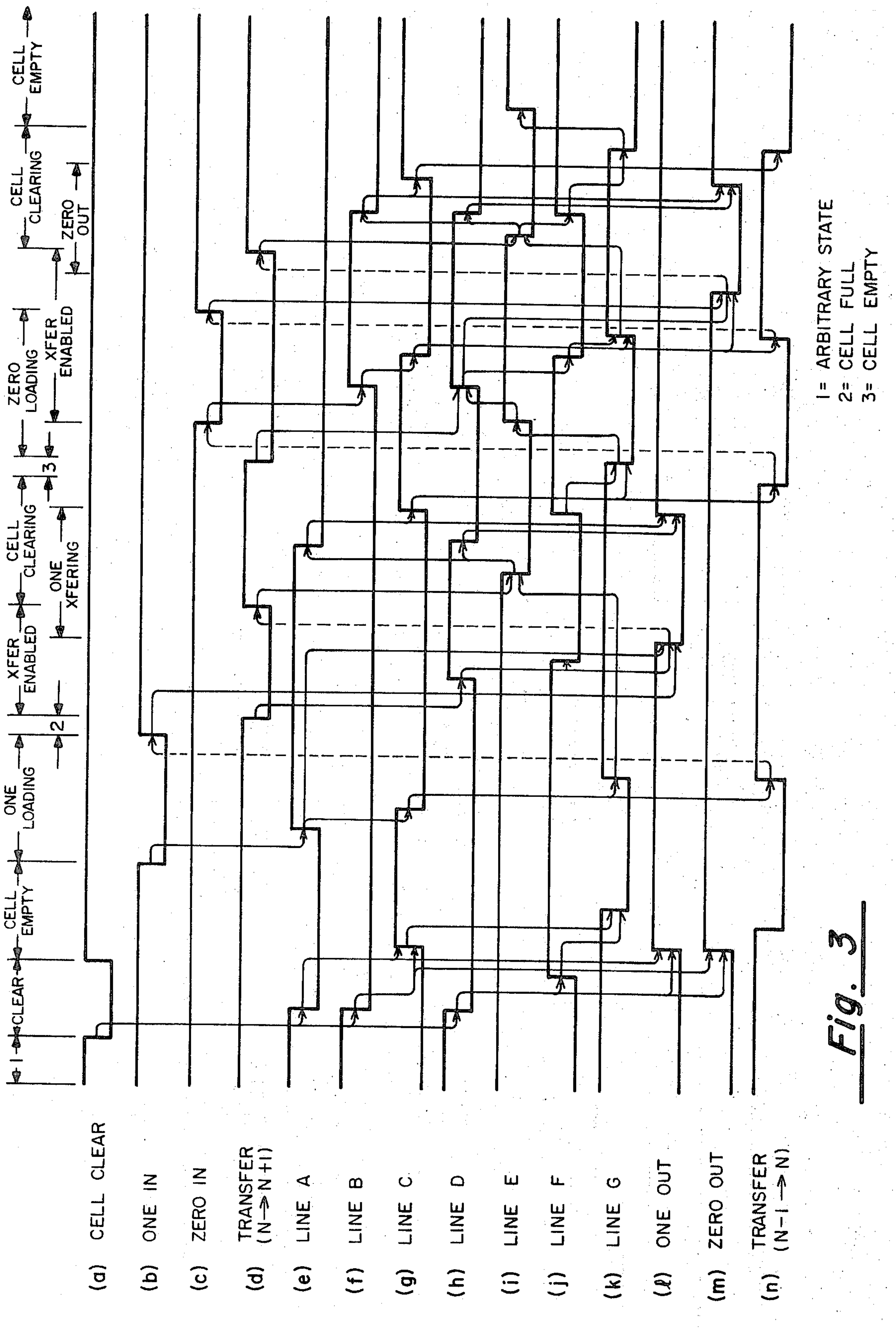
FIG. 3 represents the timing diagram utilized in conjunction with the cell of FIG. 2 in operation.

The shift cell will be considered now in greater detail by referring to both FIGS. 2 and 3. It should be noted in FIG. 3 that two complete arrows pointing to a transition indicates that the latter could be caused by either voltage previous change, whereas incomplete arrows pointing to a transition indicates that both voltage changes must occur to obtain this transition. Furthermore, the solid lines with arrows indicates an internal timing event and a dotted line with an arrow indicates an external timing event. The latter timing event will be produced by another cell either before or after the cell in question. Initially, the state of the shift cell will be assumed to be in an arbitrary state. This arbitrary state of the various units comprising the shift cell is shown in the initial section of the timing diagram shown in FIG. 3. Before operating the system shown in FIG. 2, a general clearing of the entire system is provided. This is accomplished by activating the cell general clear line (FIG. 3*a*) with an L signal. The L signal is applied to the MR terminal of flip-flops 12, 14 and 20, and causes the respective outputs or lines A, B and D to go L (FIGS. 3*e,f, h*). The 1's and 0's output line from the respective gates 16 and 18 therefore go H (see 31,*m*) indicating that the cell is cleared. Line C also goes H (FIG. 3*g*) since the input lines A and B are L. Accordingly, the L state of line D and the H state of line C cause line G to revert to an L state and the clear control flip-flop 24 to be reset. Line E therefore is H, but since it can be seen in FIG. 3 that line E was arbitrarily H during the initiation of the operation it will remain in an H state.

When the clear line E returns to the H state (FIG. 3a) the flip-flops 12, 14 and 20 will accordingly be enabled (i.e., ready to receive information) and therefore the cell is now ready for operation. At all other times the cells 12, 14 and 20 can be cleared by pulsing the enable transfer (N → N+1) L for about 50 nanoseconds.

After the above clearing operation has taken place, the cell is in an empty condition and is now ready to be loaded. The various H, L logic states of the cell components is shown in "Cell Empty" column of FIG. 3. The following illustrates how the memory cell under discussion stores a 1 bit. In order to store a 1, the 1's input line is first made to go L (FIG. 3*b*) causing the flip-flop 12 to set and raising line A to a H level (FIG. 3*e*). In other words, at this point in time terminals MR and D of the latch flip-flop 12 are H and the ME and S terminals are L. This condition as previously mentioned causes the flip-flop 12 to become set and its output (line A) to go H. The H output applied to gate 22 causes line C to go L (FIG. 3*g*) since one of the inputs to gate 22 is now H. The H input applied to inverter 30 causes its output or the enable transfer (N–1 → N) to revert to an H state (FIG. 3*n*). As previously discussed this signifies to a lower ranking cell that the instant cell under discussion is empty and can receive information. External timing to the cell (indicated by the dotted line) causes the 1's input line (FIG. 3*b*) to go H as the cell is loaded. Furthermore, line G now reverts to a H output since one of its two inputs (line C) is L. This removes the L clear signal from the output of the clear control flip-flop 24 and together with the L to H transition signal from the Enable Transfer Line N → N+1 (FIG. 3*d*) permits it to set in order to clear the cell when the transfer out is completed.

At this point in time, the shifting memory is now loaded with a 1 bit. The L-H state of the various units of the cell during one bit loading is shown in the column area identified as "one loading". The "2" colunn shown in FIG. 3 identifies the state of the units of the shift cell wherein the cell is deemed to be full.

The next step of the operation is to transfer the 1 out. If the enable transfer line (N → N+1) is L indicating that the next ranking receiving cell is ready to accept information the transfer flip-flop 20 will set causing line D to go H (FIG. 3*h*). Since the 1's input is H and lines A and D are both H, the 1's transfer gate 16 will be enabled and the output will go L transferring a 1 to the next ranking cell in series connection. It should be noted that when line D reverted to the H state during the transfer operation line F went L (FIG. 3*j*) via the inversion through gate 28. This does not cause line G to change since it was already H in view of the previous L state of line C.

It will be recalled that it was stated previously that the 0's or 1's input pulse on the transfer gates prevents the data from being duplicated at the output if the input pulse is longer than the cell cycle time. This is accomplished by applying the 1's and 0's input both to the S terminal of the flip-flops 12 and 14 as well as to the transfer gates 16 and 18. Since gate 18, for example, must have all inputs H to be enabled and the flip-flop 14 must have the S input L to be set, it is clear that if the 0 input pulse is longer than the cell cycle time the gate 18 will not be enabled and transfer cannot be accomplished.

When the next ranking cell (N+1) connected in series to the just discussed cell is loaded by the 1 bit just transferred through gate 16, the enable transfer line (N → N+1) will be raised from L to H by an external timing event (not shown) in the next receiving cell. During this time period the transfer flip-flop 20 will remain set after the Enable Transfer Signal (N → N+1) goes H and the Clear Control flip-flop 24 will now become set. The clear flip-flop 24 will become set since it will be recalled that Enable Transfer (N → N+1) provided a L-H transition (FIG. 3*d*) and the inputs to terminals D and C are H. The transition signal accordingly sets the flip-flop 24 causing its output or line E (FIG. 3*i*) to go L. Line E going L resets the flip-flops 12 and 14 causing lines A, (FIG. 3*e*), D (FIG. 3*h*) to go L and since line B is already L (FIG. 3*f*) in turn causing data transfer to cease (FIG. 3*l*). Lines A, B and D going L cause the flip-flop 24 to be reset as line G goes L (FIG. 3*k*).

As soon as lines A and B are both L the enable transfer (N−1 → N) goes L (FIG. 3*m*) since the H signal is inverted by gate 30. Line C going H and line F going H causes line G (FIG. 3*k*) to go L. The cell is now empty and is capable of being loaded again. Column 3 as well as the "Cell Clearing" and "One Transferring" columns of FIG. 3 show the operation of the various components during this time period. The following will discuss the circuit operation for storing a 0 in the instant shifting memory cell.

It will be recalled that line G reverts to an L state during the cell empty state (FIG. 3*k*) and line E accordingly rises to a H level (FIg. 3*i*). The Enable Transfer (N → N+1) reverts to L (FIG. 3*d*) after the cell clearing operation (see col. 3). The transfer flip-flop 20 is therefore set and output line D goes H (FIG. 3*h*) since the input terminals MR and D are H and terminals ME and S are L. Accordingly, to load a 0 into the memory the 0's input line is dropped to L (FIG. 3*c*). This causes the latch flip-flop 14 to be set and line B to go H (FIG. 3*f*) since its input terminals MR and D are H, and ME and S are L. When line B goes H it causes line C to go L (FIG. 3*g*). This causes the enable transfer line (N−1 → N) to go H indicating to the lower ranking cell that the instant cell is loaded.

The 0 stored in the cell is transferred in the manner previously described. Thus, line D was previously made H (FIG. 3*h*) by the setting of flip-flop 20 and line B was also made H due to the setting of flip-flop 14. Since the "Zero's Input" line was previously made H (FIG. 3*c*), the zero transfer gate 18 is enabled and its output switches L (FIG. 3*m*) thereby transferring a 0 out of the memory cell.

When the next ranking cell in series is loaded with a 0 bit, it will raise the Enable Transfer (N → N+1) H (FIG. 3*d*) indicating completion of transfer. The latch flip-flop 20 will remain set during this period and the Clear flip-flop will now become set. The setting of flip-flop 20 caused line D to rise to an H level and line F to switch L after inversion by gate 28. Either line C or F being L causes line G to be H. A L-H transition of the Enable Transfer thereby sets the Clear flip-flop 24 which provides a L signal at its output line E. Line E going L resets the quad latch flip-flops 14 and 20. Also, since line C has gone H (FIG. 3*g*) the Enable Transfer (N−1 → N) goes L (FIG. 3*n*) in view of inversion of this signal by gate 30. This indicates to the cell next below in series to the instantly discussed cell is empty and is capable of being loaded again.

Figure 4:
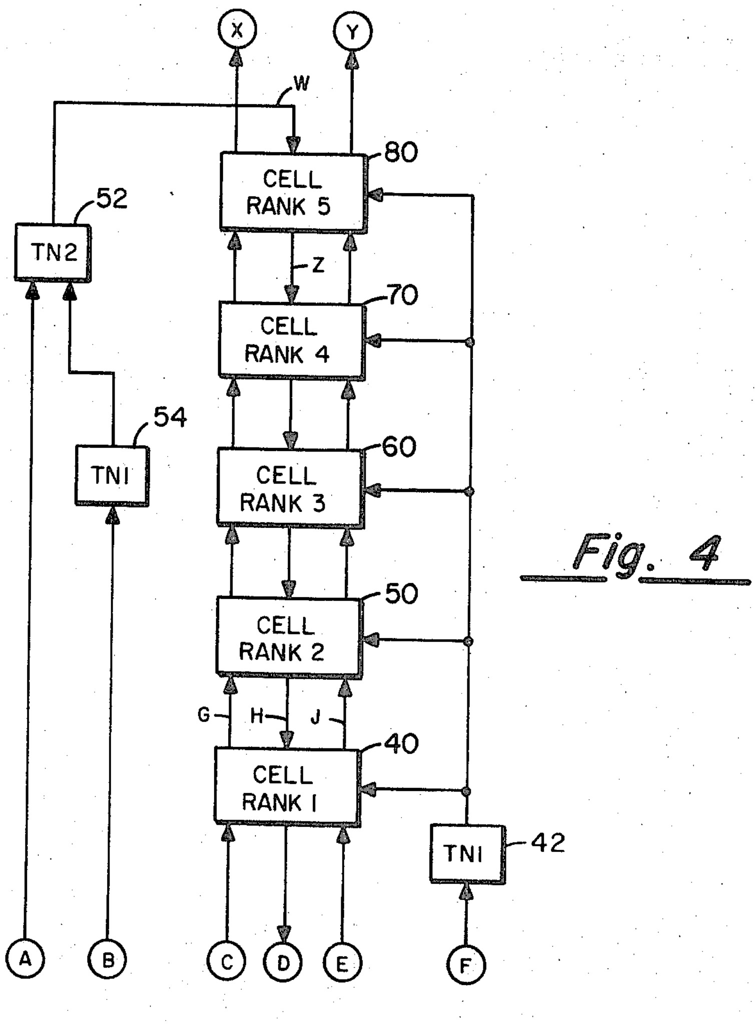
FIG. 4 represents a system arrangement utilizing a plurality of shifting cells as described in FIGS. 1 and 2.

Referring now to FIG. 4, there is depicted a deskewing system utilizing a plurality of shifting cells of the type previously described. The deskewing system is formed by stacking as many cells as necessary to accomplish the desired result and in the preferred embodiment five cells, 40, 50, 60, 70 and 80, are utilized. Cell Rank 2 may be identified as the nth cell, whereas Cell Rank 1 and 3 are *n*−1 and *n*+1, respectively.

In cell 40, for example, lines C and E are the 1's and 0's input lines, respectively, whereas line D is the Enable Transfer (N−1 → N) line. The voltage state on this line will determine whether the cell is full or empty. Line F, which is connected to all of the ranking cells is the General Clear which overrides all other signals is applied through an inverter 42. Lines G and J are the 1's and 0's output line, respectively, and line H is the Enable Transfer line (N → N+1). As previously stated, a positive going edge on this line causes the cell to start clearing and by going positive it is signified that transfer is terminated. This signal arrangement, as above discussed, is appliable to the ranking cells 2–4.

With respect to Cell 80, lines X and Y are the respective 1's and 0's output line and may be directed, for example, into a buffer store or central processor of a computer. The input lines C and E may, for example, originate as the output from the reading of a magnetic tape. Since the present invention is asynchronous (i.e., does not utilize a clock timing signal), it may be conveniently utilized with a tape that is skewed or out of alignment and other uses may readily be found by those skilled in the art.

In order to transfer the information to the X, Y output terminals, the line Z is sampled by means (not shown) for voltage. If line Z indicates that cell 80 is full, signals A and B are applied to the NAND gate 52 and the inverter 54 such that the Enable Transfer W will cause information to be transmitted to lines X or Y.

What is claimed is:

1. An asynchronous shifting storage cell construction having a designated cell cycle time and for receiving data which may be longer than said cycle time comprising:

a. at least first and second flip-flop means for respectively storing a one and zero data bit signal;

b. means connected to the output of said flip-flops for determining whether said respective flip-flops are respectively storing a one or alternatively, a zero data bit;

c. a third flip-flop coupled to said first and second flip-flop means;

d. gating means connected to the output of each said first and second flip-flop for transferring said stored data bits to an output line upon initiation by said third flip-flop;

e. whereby the respective one and zero data bit signals are simultaneously applied to said flip-flop means and said gating means to prevent said data from being duplicated at said output when the data bits are longer than the cell cycle time.

2. An asynchronous shifting cell in accordance with claim 1 wherein a fourth flip-flop is provided, said fourth flip-flop being an edge triggering flip-flop which clears said first and second flip-flops after information has been transferred by said gating means.

3. An asynchronous shifting storage cell in accordance with claim 1 wherein said means for determining whether said respective flip-flops are storing data comprises a NOR gating means.

4. An asynchronous shifting storage cell in accordance with claim 1 wherein said means for transferring stored bits to an output line comprises NAND gating means.

* * * * *